(12) United States Patent
Roditi et al.

(10) Patent No.: US 7,977,023 B2
(45) Date of Patent: Jul. 12, 2011

(54) INK FORMULATIONS AND METHODS OF MAKING INK FORMULATIONS

(75) Inventors: Stella Stolin Roditi, Rehovot (IL); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1019 days.

(21) Appl. No.: 11/828,386

(22) Filed: Jul. 26, 2007

(65) Prior Publication Data

US 2009/0029273 A1  Jan. 29, 2009

(51) Int. Cl.
*G03G 9/00* (2006.01)

(52) U.S. Cl. ......................................... 430/114; 430/115

(58) Field of Classification Search .................. 430/114, 430/115
See application file for complete search history.

(56) References Cited

U.S. PATENT DOCUMENTS

| | | | |
|---|---|---|---|
| 4,678,317 A | 7/1987 | Grossinger |
| 4,794,651 A | 12/1988 | Landa et al. |
| 4,842,974 A | 6/1989 | Landa et al. |
| 4,860,924 A | 8/1989 | Simms et al. |
| 4,980,259 A | 12/1990 | Landa et al. |
| 4,985,732 A | 1/1991 | Landa et al. |
| 5,028,964 A | 7/1991 | Landa et al. |
| 5,034,778 A | 7/1991 | Levanon et al. |
| 5,047,306 A | 9/1991 | Almog |
| 5,047,808 A | 9/1991 | Landa et al. |
| 5,078,504 A | 1/1992 | Landa et al. |
| 5,117,263 A | 5/1992 | Adam et al. |
| 5,148,222 A | 9/1992 | Lior et al. |
| 5,157,238 A | 10/1992 | Landa et al. |
| 5,166,734 A | 11/1992 | Pinhas et al. |
| 5,192,638 A | 3/1993 | Landa et al. |
| 5,208,130 A | 5/1993 | Almog et al. |
| 5,225,306 A | 7/1993 | Almog et al. |
| 5,231,454 A | 7/1993 | Landa |
| 5,255,058 A | 10/1993 | Pinhas et al. |
| 5,264,312 A | 11/1993 | Stolka et al. |
| 5,266,435 A | 11/1993 | Almog |
| 5,268,687 A | 12/1993 | Peled et al. |
| 5,270,776 A | 12/1993 | Landa |
| 5,276,492 A | 1/1994 | Landa et al. |
| 5,278,615 A | 1/1994 | Landa |
| 5,280,326 A | 1/1994 | Pinhas et al. |
| 5,286,593 A | 2/1994 | Landa et al. |
| 5,286,948 A | 2/1994 | Landa et al. |
| 5,289,238 A | 2/1994 | Lior et al. |
| 5,300,390 A | 4/1994 | Landa et al. |
| 5,315,321 A | 5/1994 | Peled et al. |
| 5,335,054 A | 8/1994 | Landa et al. |
| 5,337,131 A | 8/1994 | Sagiv et al. |
| 5,346,796 A | 9/1994 | Almog |
| 5,376,491 A | 12/1994 | Krumberg et al. |

(Continued)

FOREIGN PATENT DOCUMENTS

WO   WO/92/17823   10/1992

OTHER PUBLICATIONS

WO search report dated Jan. 20, 2009.

*Primary Examiner* — Mark A Chapman (57) ABSTRACT

Briefly described, embodiments of this disclosure include ink composition for use in electrostatic imaging, method of making an ink formulation for use in electrostatic imaging, and the like.

16 Claims, 7 Drawing Sheets

U.S. PATENT DOCUMENTS

| | | |
|---|---|---|
| 5,380,611 A | 1/1995 | Landa |
| 5,407,307 A | 4/1995 | Park |
| 5,407,771 A | 4/1995 | Landa et al. |
| 5,426,491 A | 6/1995 | Landa et al. |
| 5,436,706 A | 7/1995 | Landa et al. |
| 5,497,222 A | 3/1996 | Landa et al. |
| 5,508,790 A | 4/1996 | Belinkov et al. |
| 5,521,046 A | 5/1996 | Materazzi |
| 5,527,652 A | 6/1996 | Krumberg et al. |
| 5,552,875 A | 9/1996 | Sagiv et al. |
| 5,554,476 A | 9/1996 | Landa et al. |
| 5,555,185 A | 9/1996 | Landa |
| 5,557,376 A | 9/1996 | Landa et al. |
| 5,558,970 A | 9/1996 | Landa et al. |
| 5,570,193 A | 10/1996 | Landa et al. |
| 5,655,194 A | 8/1997 | Landa et al. |
| 5,792,584 A | 8/1998 | Almog |
| 5,923,929 A | 7/1999 | Ben Avraham et al. |
| 6,341,856 B1 | 1/2002 | Thomson et al. |
| 6,428,148 B1 | 8/2002 | Gore |
| 6,623,902 B1 * | 9/2003 | Ben-Avraham et al. ...... 430/114 |
| 6,692,881 B2 | 2/2004 | Tsubuko et al. |
| 7,517,622 B2 * | 4/2009 | Golodetz et al. ............. 430/45.2 |
| 2004/0023143 A1* | 2/2004 | Ben-Avraham et al. ...... 430/114 |
| 2005/0221209 A1* | 10/2005 | Golodetz et al. ................ 430/45 |
| 2006/0093936 A1* | 5/2006 | Spector et al. ............. 430/108.1 |

* cited by examiner

INK FORMULATIONS AND METHODS OF MAKING INK FORMULATIONS

BACKGROUND

Various techniques for electrostatic image transfer are known. One method includes the use of an intermediate transfer member. A liquid image, which includes a liquid carrier having ink particles dispersed therein, is transferred from a photoconductive surface of a photoconductive member or drum to a surface (e.g., a release layer or blanket) of the intermediate transfer member. The liquid image is attracted from the photoconductive surface to the surface of the intermediate transfer member. The liquid carrier is removed from the surface of the intermediate transfer member and the ink particles are compacted on the surface in the image configuration. Thereafter, the ink particles are transferred from the surface of the intermediate transfer member to a substrate in the image configuration by electrostatic attraction.

Modern liquid toner electrostatic imaging began with the invention of a new class of toners referred to as ElectroInk™. This type of toner (also referred to as ink formulation) is characterized by its toner particles being dispersed in a carrier liquid, where the toner particles include a core of a polymer with fibrous extensions extending from the core. When the toner particles are dispersed in the carrier liquid in a low concentration, the particles remain separate. When the toner develops an electrostatic image, the concentration of toner particles increases and the fibrous extensions interlock. A large number of patents and patent applications are directed toward this type of toner (e.g., U.S. Pat. Nos. 4,794,651; 5,047,306; 5,208,130). It has been discovered that this type of toner allows for high quality offset printing at high speed. This type of printing is described the following U.S. Pat. Nos. 4,678,317; 4,860,924; 4,980,259; 4,985,732; 5,028,964; and 5,034,778.

However, the toners currently used include deficiencies relating to scratch resistance, rub resistance, and substrate adhesion. Therefore, a need exists in the art for ink formulations improve scratch resistance, rub resistance, and/or substrate adhesion.

SUMMARY

Briefly described, embodiments of this disclosure include ink composition for use in electrostatic imaging, method of making an ink formulation for use in electrostatic imaging, methods of using an ink, and the like. One exemplary embodiment of an ink composition, among others, includes: a carrier liquid, a resin, a colorant, and a co-resin polymer, wherein the co-resin polymer is selected from: an ethylene acrylic acid co-polymer, a maleic anhydride polymer having polyethylene grafted to the polymer, and combinations thereof.

One exemplary embodiment of a method of making an ink formulation, among others, includes: mixing a carrier liquid, a resin, a colorant, and a co-resin polymer, wherein the co-resin polymer is selected from: an ethylene acrylic acid co-polymer, a maleic anhydride polymer having polyethylene grafted to the polymer, and combinations thereof.

One exemplary embodiment of a method of using an ink, among others, includes: disposing an ink onto a substrate, wherein the ink includes: a carrier liquid, a resin, a colorant, and a co-resin polymer, wherein the co-resin polymer is selected from: an ethylene acrylic acid co-polymer, a maleic anhydride polymer having polyethylene grafted to the polymer, and combinations thereof.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Embodiments of the present disclosure will employ, unless otherwise indicated, techniques of synthetic organic chemistry, ink chemistry, solvent chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing and test processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure include ink formulations, methods of making ink formulations, and methods of using the ink formulation. Embodiments of the ink formulation can be printed onto a substrate (e.g., coated and uncoated paper) and the printed portion has one or more of the following: enhanced adhesion to the substrate, enhanced scratch resistance, and enhanced rub resistance, relative to substrates printed upon by other ink formulations. In particular, an embodiment showed improved scratch resistance of 4× relative to a standard. Additional details regarding the enhanced characteristics are described in the Examples.

The ink formulation includes, but is not limited to, a carrier liquid, a resin, a colorant, and a co-resin polymer. In addition, the ink formulation may include one or more of the following: a charge adjuvant, a charge director, a surface modifier, compatibility additives, charging additives, transfer additives, and other additives.

Although not intending to be bound by theory, embodiments of the present disclosure are believed to create enhanced adhesion between the ink formulation and the substrate because of the interaction of the chemical groups (e.g., carboxylic acid groups) of the co-resin polymers present in the ink formulation with the chemical groups (e.g., polar groups) of the substrate. It should also be noted that it is believed the co-resin polymer and resin interact so that the co-resin polymer acts as a crosslinker for the resin, which manifests itself by having enhanced scratch and rub resistance.

As mentioned above, embodiments of the present disclosure provide for ink formulations having enhanced adhesion to the substrate, enhanced scratch resistance, and enhanced rub resistance, relative to substrates printed upon by other ink formulations. In particular, embodiments of the present disclosure provide for ink formulations having enhanced adhesion to coated styrene-butadien rubber (SBR) coated acrylic paper, and uncoated paper. For example, using an embodiment of the ink formulation on coated SBR reduced damage from 5 to 10% damage in a peeling test to 0-2% damage. In another embodiment, using an embodiment of the ink formulation on coated acrylic papers reduced damage from about 50% in a peeling test to about 20% damage. In another embodiment, using an embodiment of the ink formulation on uncoated paper reduced damage from about 30 to 40% to about 10 to 20% damage. In another Example involving the Taber shear test, using an embodiment of the ink formulation on acrylic coated paper reduced micrograms of debris removed from about 500 to 250. In another embodiment, using an embodiment of the ink formulation on semiacrylic coated paper reduced micrograms of debris removed from about 400 to 150. In another embodiment, using an embodiment of the ink formulation on uncoated paper reduced micrograms of debris removed from about 80 to 40. In another Example involving the Sutherland rub tester, using an embodiment of the ink formulation on acrylic coated paper reduced damage from about 65% to about 50%.

The co-resin polymer can include, but is not limited to, an ethylene acrylic acid co-polymer, a maleic anhydride polymer having polyethylene grafted to the polymer, and combinations thereof. Embodiments of the ethylene acrylic acid co-polymer include co-polymers having a DSC melting point of about 55 to 65, about 57 to 63, and about 60° C. Embodiments of the ethylene acrylic acid co-polymer include co-polymers having a melt viscosity of about 20,000 to 40,000, about 25,000 to 35,000, and about 30,000 cps at about 60° C. Embodiments of the ethylene acrylic acid co-polymer include co-polymers having an acid number of about 150 to 250, about 170 to 225, and about 170 to 200 mg KOH/gr. In an embodiment, co-resin polymer was an ethylene acrylic acid copolymer that was a random copolymer, tacky at room temperature, and non-crystalline. In another embodiment, the ethylene acrylic acid copolymer was solid at room temperature, had a very high melt flow index (e.g., about 1300 gm/10 min, acc. to ASTM D-1238) and low mp (75° C.). The melt viscosity was determined using an Advanced Rheometer AR 2000 TA Instruments Inc. In particular, about 3-5 grams of the sample was put between 2 plates and subjected to 10 Hz to determine the melt viscosity.

Embodiments of the maleic anhydride polymer having polyethylene grafted to the polymer include polymers having an acid number of about 25 to 45, about 30 to 40, about 33 to 37, and about 34 mg KOH/gr. In addition, the maleic anhydride polymer has a melt viscosity about 4200 cps (at 140° C.) and a DSC melting point of about 106° C.

The amount of co-resin can range from about 14 to 50, about 10 to 40, and 10 to 20% weight of the ink formulation. The amount of co-resin can range from about 20 to 70, about 15 to 55, and about 15 to 25% of the solid/non-volatile ingredients.

The resin can include, but is not limited to, thermoplastic toner resins. In particular, the resin can include, but is not limited to, ethylene acid copolymers; ethylene acrylic acid copolymers; methacrylic acid copolymers; ethylene vinyl acetate copolymers; copolymers of ethylene (80 to 99.9%), acrylic, or methacrylic acid (20 to 0.1%)/alkyl (C1 to C5) ester of methacrylic or acrylic acid (0.1 to 20%); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid wherein alkyl is from: 1 to about 20 carbon atoms, like methyl methacrylate (50 to 90%)/methacrylic acid (0 to 20 percent/ethylhexylacrylate (10 to 50%)); ethylene-acrylate terpolymers: ethylene-acrylic esters-maleic anhydride (MAH) or glycidyl methacrylate (GMA) terpolymers; low molecular weight ethylene-acrylic acid ionomers and combinations thereof.

In an embodiment, the resin can include the Nucrel family of toners (e.g., Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)). The resin is about 5 to 80, about 10 to 60, and about 15 to 40% by total weight of the ink toner.

The carrier liquid can include, but is not limited to, an insulating, nonpolar liquid that is used as the medium for toner particles. The carrier liquid can include compounds that have a resistivity in excess of about $10^9$ ohm-cm and a dielectric constant below about 3.0. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof.

Illustrative carrier liquids include, but are not limited to, aliphatic hydrocarbon, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK). Carrier liquids and other components of the present disclosure are described in U.S. Pat. No. 6,337,168, U.S. Pat. No. 6,070,042, and U.S. Pat. No. 5,192,638.

The carrier liquid is about 20 to 95, about 40 to 90, and about 60 to 80% weight of the ink formulation.

In an embodiment, the ink formulation can include a charge adjuvant. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an embodiment, the charge adjuvant is aluminum tristearate. The charge adjuvant is about 0.1 to 5, about 0.5 to 4, and about 1 to 3% weight of the ink formulation.

The charge director can include, but is not limited to, lecithin, oil-soluble petroleum sulfonates (e.g., neutral Calcium Petronate™, neutral Barium Petronate™, and basic Barium Petronate™), polybutylene succinimides (e.g., OLOA™1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. The charge director is about 0.001 to 1% weight of the ink formulation.

The colorants can include organic and/or inorganic colorants. The colorants can include, but are not limited to, cyan colorants, magenta colorants, yellow colorants, violet colorants, orange colorants, green colorants colorants, black colorants, and combinations thereof. Colorants used in conjunction with ElectroInk® based systems are known in the art. The colorant is about 0.1% to 80% weight of the ink formulation.

In an embodiment, the ink formulation can be prepared by mixing the resin, co-resin polymer, and the liquid carrier. Initially, the resin and co-resin polymer are mixed (e.g., as is or in a molten state) at a ratio of about 1:4 to 4:6 (co-resin polymer:resin). Subsequently, the mixture of the resin/co-resin polymer are mixed with the carrier liquid, and heated to achieve a homogeneous mixture. The mixture is cooled to achieve a mash consistency. Additional components (e.g., a colorant, charge adjuvant, a charge director, a surface modifier, compatibility additives, charging additives, transfer additives, and other additives) could be added to the mixture during the heating process and/or are ground with the mixture to form the final ink formulation.

While embodiments of the present disclosure are described in connection with Examples and the corresponding text and figures, there is no intent to limit the disclosure to the embodiments in these descriptions. On the contrary, the intent is to cover alternatives, modifications, and equivalents included within the spirit and scope of embodiments of the present disclosure.

EXAMPLE 1

Figure 1:
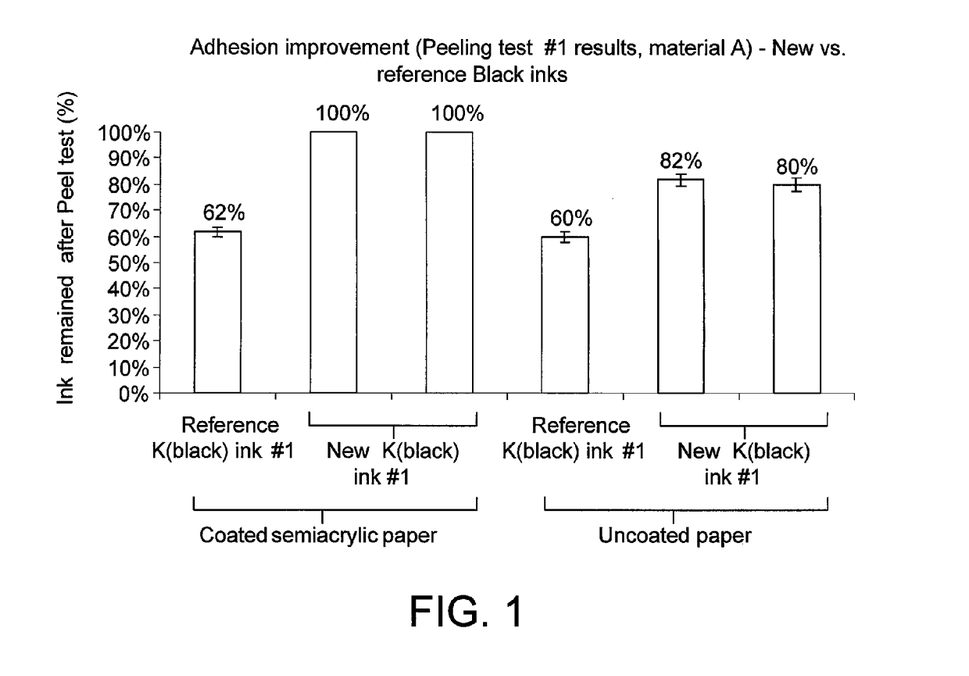
FIG. 1 illustrates adhesion improvement to paper due to incorporation of the material noted in the figure into an embodiment of the black ink formulation.

FIG. 1 illustrates adhesion improvement to paper due to incorporation of the material discussed into black ink formulation. The adhesion level to paper is measured using a so called "Peeling" method. The adhesion level to paper is measured using a so called "Peeling" method. In this method, stripes of a standard pressure sensitive adhesive tape are applied onto a fresh printed image, using a standard force, and subsequently peeled off the image. The damaged image thus obtained (as manifested in exposed areas of the underlying paper) is scanned, the white area is substracted from 100% of the image before damage and the percentage of the remaining ink is reported. The previous ink version is marked Reference, while improved embodiments of the ink are marked new ink The reference ink is based on EMAA:EAA 4:1 blend, with both ingredients having lower acid number values (EMM 11% acid as compared to 15% acid in current version, and EAA co-resin with 15% acid number as compared to 23% in current version; additional differences is the lower melt flow rate of the main resin-EAA in the current version, and the EAA co-resin being solid at RT).

EXAMPLE 2

Figure 2:
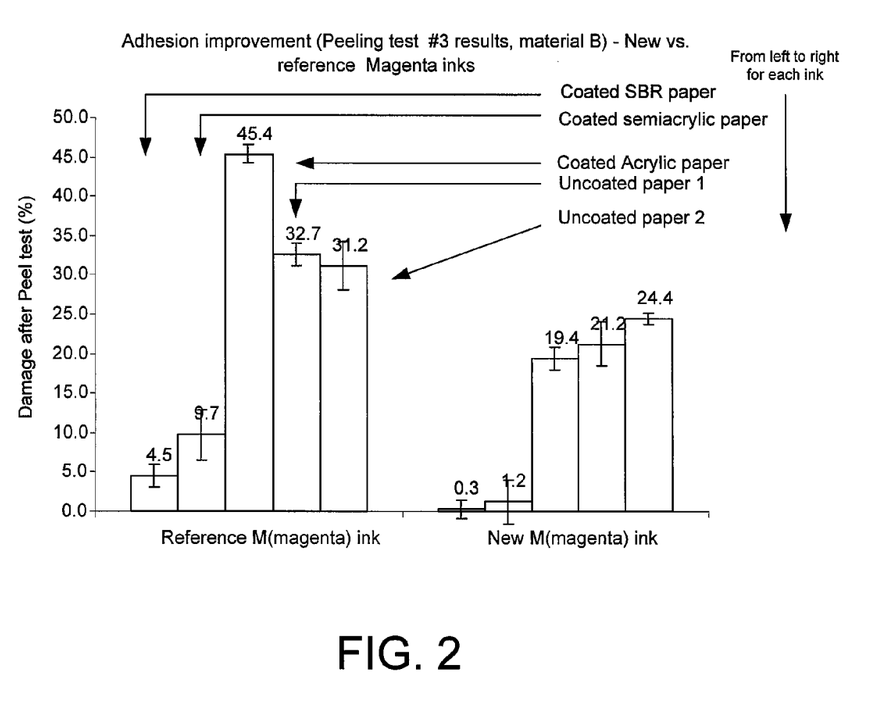
FIG. 2 illustrates peeling test results of an embodiment of a magenta ink with another resin. In this case the damage % (i.e., the percentage of ink removed) is reported.

FIG. 2 illustrates peeling test results of magenta ink with another resin (EMM 11% acid:EAA 15% acid at 4:1 ratio) and magenta ink with the a formulation of the present disclosure (EMAA 15% acid EAA 23% acid at 4:1 ratio). In this case the damage % is the percentage of ink removed from the substrate.

EXAMPLE 3

Figure 3:
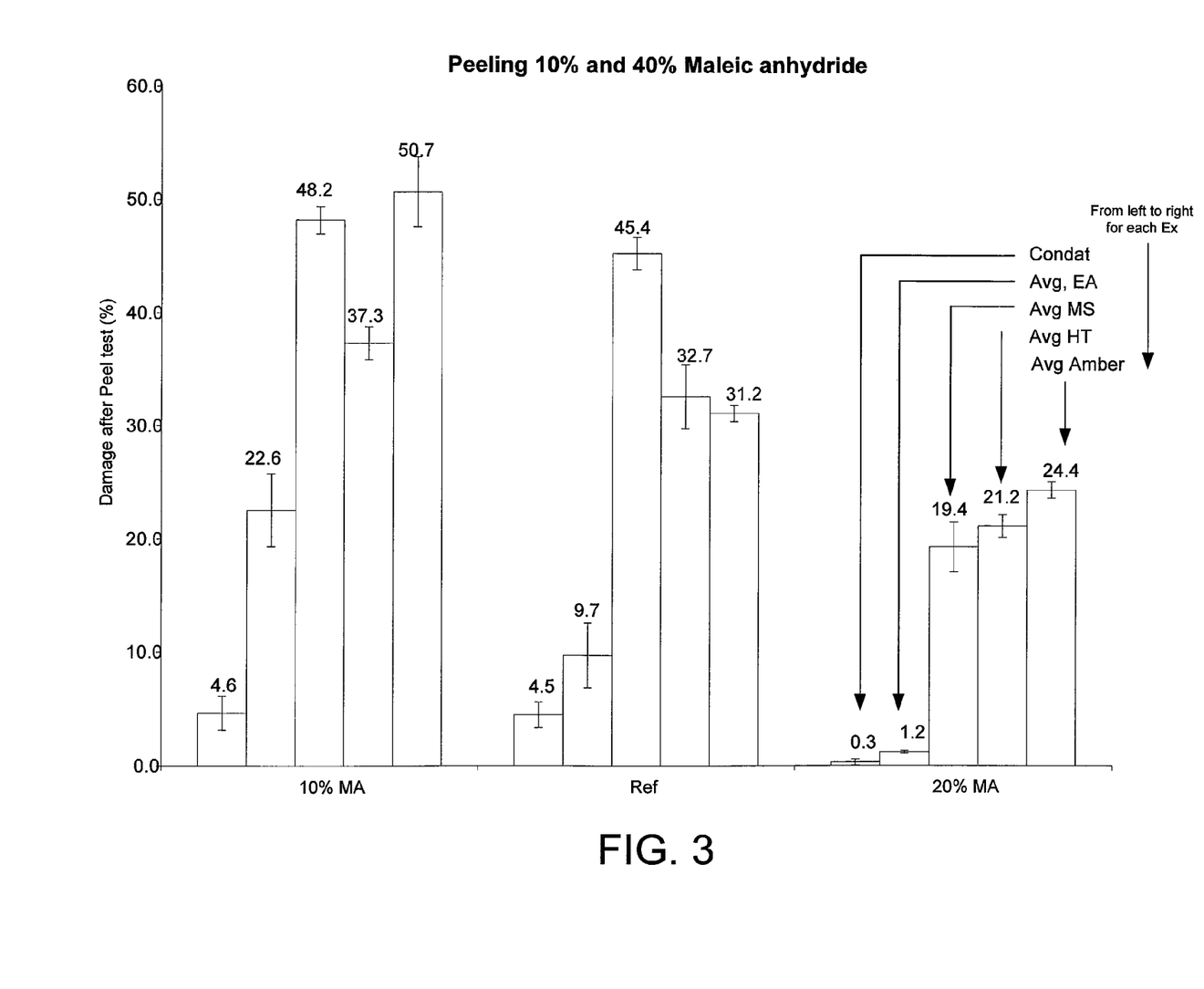
FIG. 3 illustrates peeling test results magenta ink with embodiments of the present disclosure including 10% and 20% of MA grafted polyethylene. In this case the damage % (i.e., the percentage of ink removed) is reported.

FIG. 3 illustrates peeling test results of magenta ink with 10% and 20% of MA grafted polyethylene. In this case the damage % (i.e., the percentage of ink removed) is reported. In particular, FIG. 3 illustrates peeling test results of EMAA 15% acid:MA grafted PE 34 saponification number which is approx. half the acid number, at 9:1 and 4:1 ratio.

EXAMPLE 4

Figure 4:
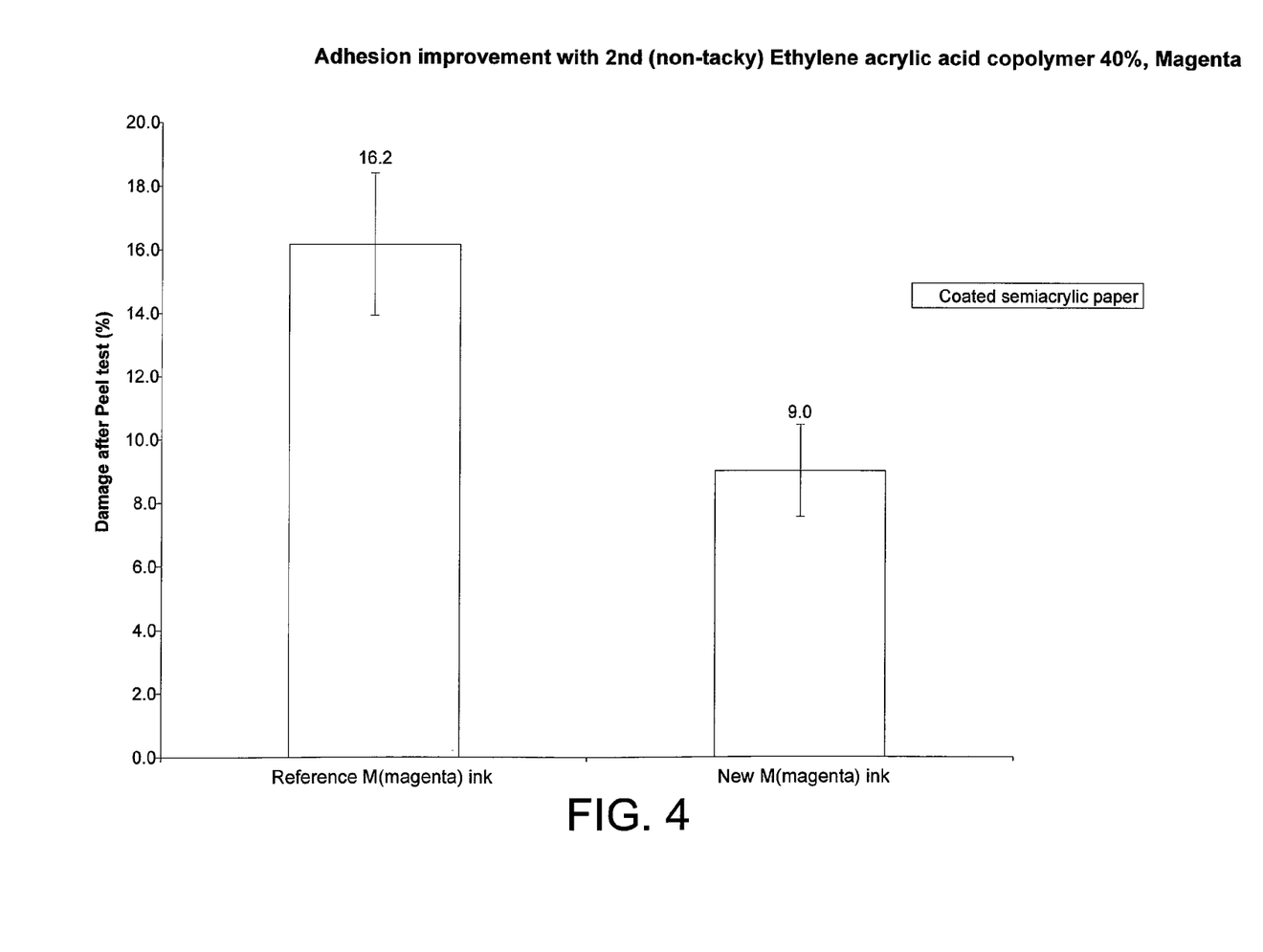
FIG. 4 illustrates peeling test results of magenta ink with an embodiment of the present disclosure including a solid (non-tacky) EAA copolymer (40% w/w), and the percentage of ink removed is reported.

FIG. 4 illustrates peeling test results of magenta ink with solid (non-tacky) EM copolymer (40% w/w), and the percentage of ink removed is reported.

EXAMPLE 5

Figure 5:
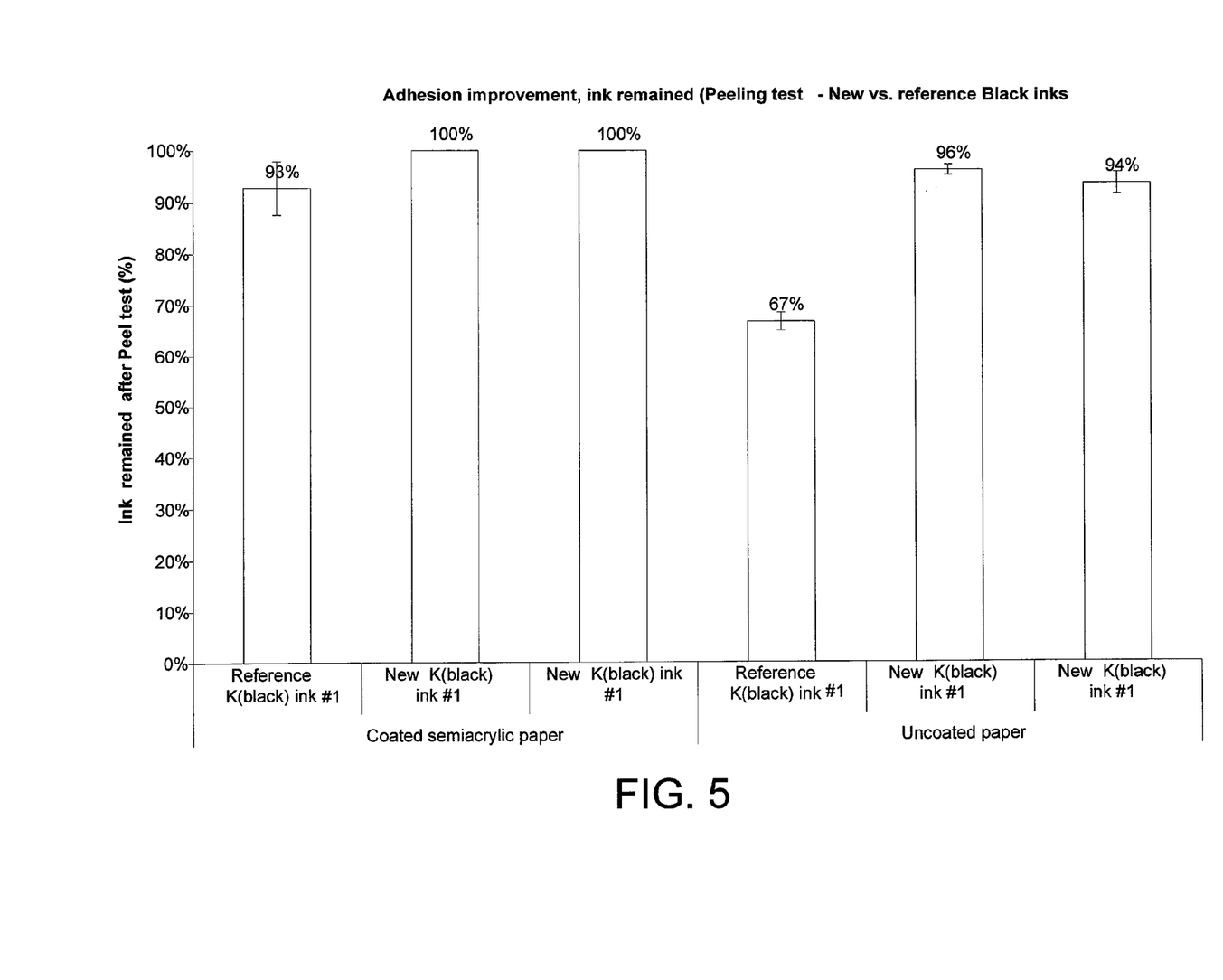
FIG. 5 illustrates peeling test results of adhesion improvement to 3 types of coated and 3 types of uncoated paper types, due to incorporation of the material noted in the figure into an embodiment of the black ink formulation at 20% (w/w) level. A previous ink version is marked Reference, while improved embodiments of the ink are marked new ink. The percentage of ink remaining on paper is reported.

FIG. 5 illustrates peeling test results of adhesion improvement to 3 types of coated and 3 types of uncoated paper types, due to incorporation of the material discussed into black ink formulation, at 20% (w/w) level. The previous ink version is marked Reference, while the improved embodiment of the inks are marked new ink. The percentage of ink remaining on paper is reported.

EXAMPLE 6

Figure 6:
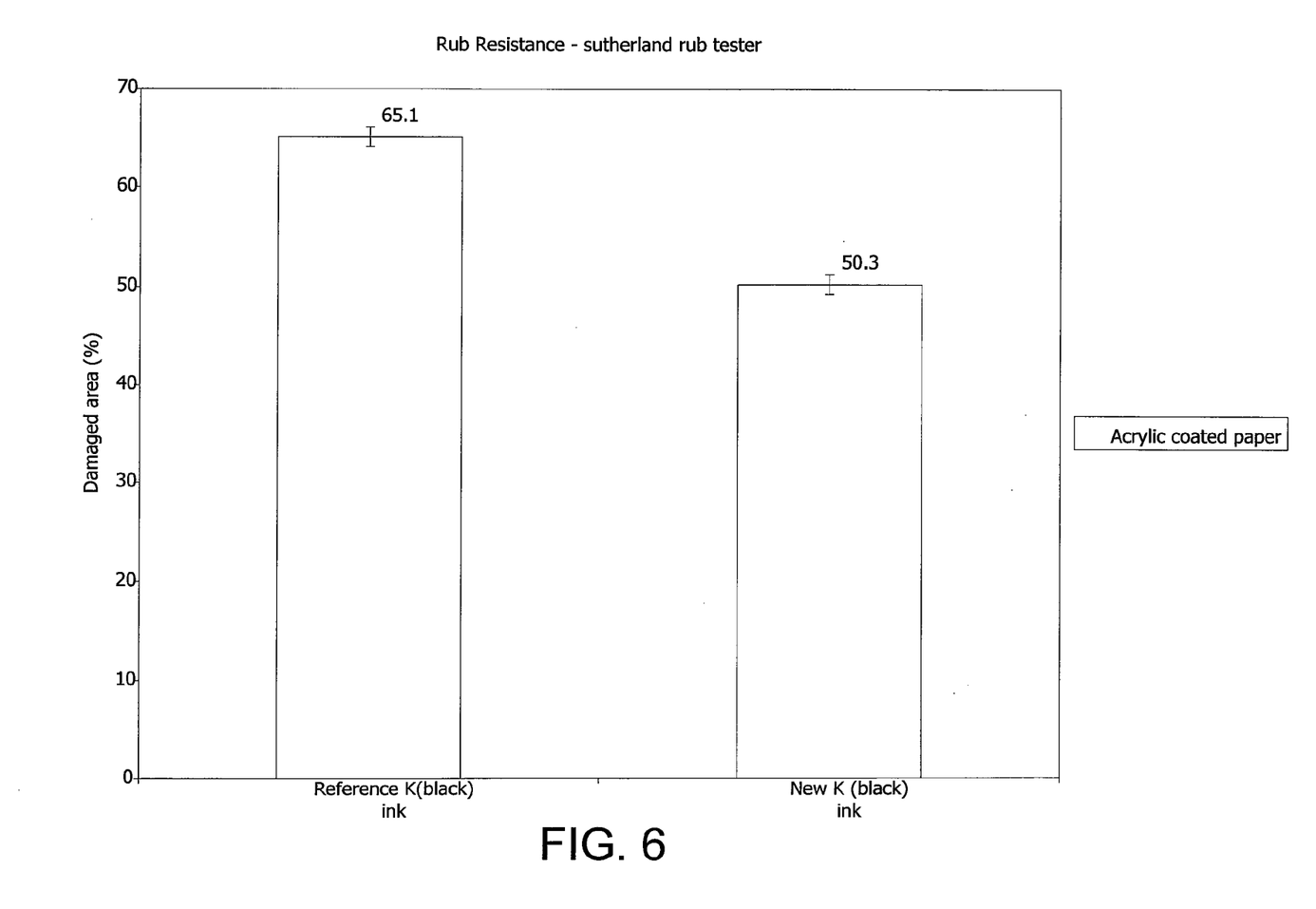
FIG. 6 illustrates Sutherland rub test results of omega printed with an embodiment of black ink (K) due to incorporation of the material noted in the figure into the black ink formulation at 20% (w/w) level. A previous ink version is marked Reference, while an improved embodiment of the ink is marked new ink.

FIG. 6 illustrates Sutherland rub test results of omega printed with K (black ink) due to incorporation of the material discussed into black ink formulation, at 20% (w/w) level. The previous ink version is marked Reference, while the improved embodiment of the ink is marked new ink.

EXAMPLE 7

Figure 7:
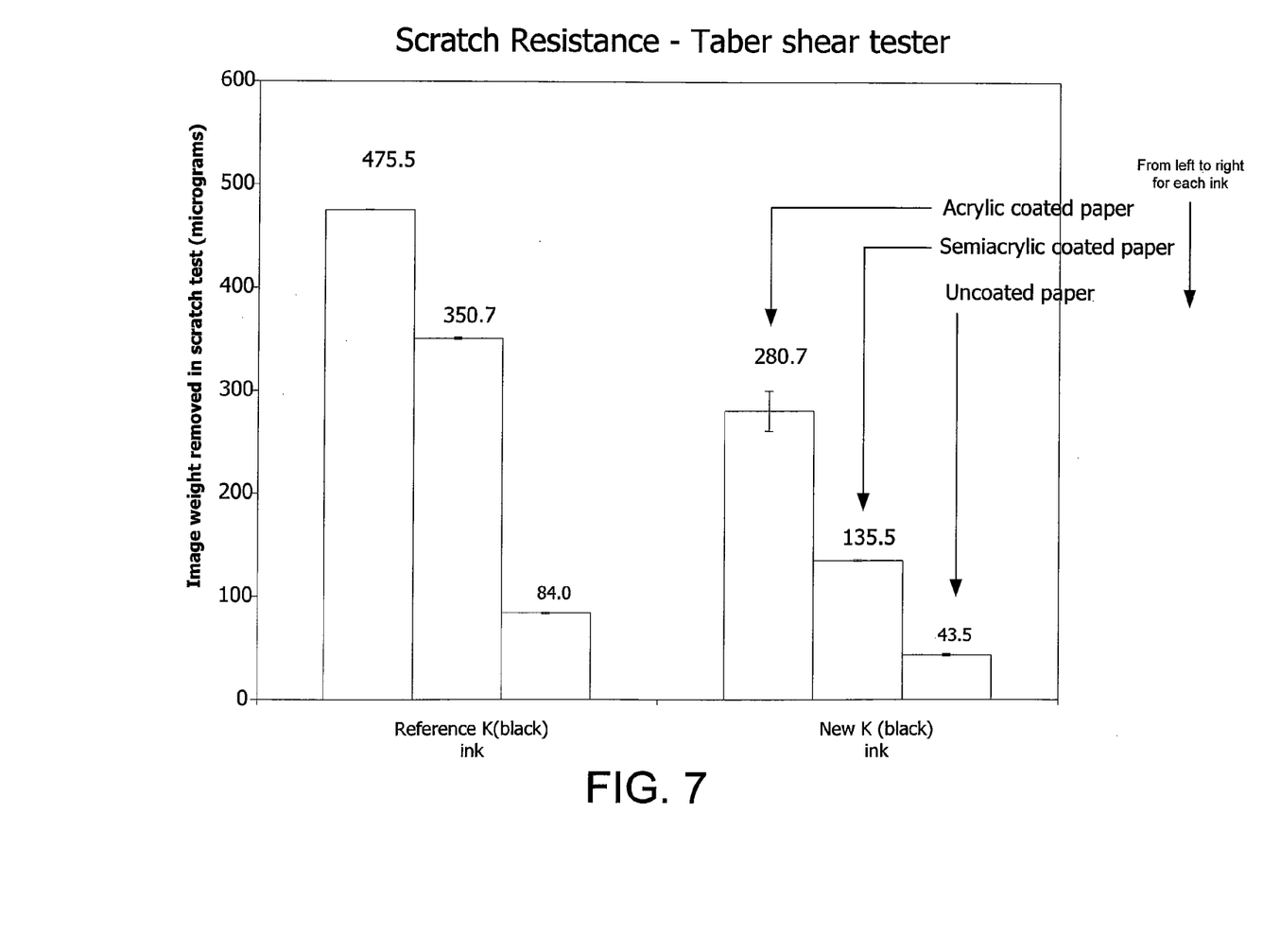
FIG. 7 illustrates Taber shear test results showing improvement due to incorporation of the material noted in the figure into embodiments of black ink formulations at 20% (w/w) level. The previous ink version is marked Reference, while improved embodiments of the ink are marked new ink.

FIG. 7 illustrates Taber shear test results improvement due to incorporation of the material discussed into black ink formulation at 20% (w/w) level. The resistance of the printed image to scratches is evaluated using Taber shear test device, similar to gramphone needle playing a music record. In this method debris is removed, after a certain time from a "heavy" (400% coverage image) printed on paper. This is achieved by plowing a circular scratch into the image with a sharp metallic nail. After that, the debris removed is weighed (in micrograms) and reported as damage level. The higher the weight, the more severe the damage. The previous ink version is marked Reference, while improved embodiments of the ink are marked new ink.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

At least the following is claimed:

1. An ink composition, comprising: a carrier liquid, a resin, a colorant, and a co-resin polymer including an ethylene acrylic acid co-polymer and a maleic anhydride polymer having polyethylene grafted to the polymer, wherein the ethylene acrylic acid co-polymer includes co-polymers having a melt viscosity of about 20,000 to 40,000 cps at about 60° C. and an acid number of about 150 to 250 mg KOH/gr, and wherein the maleic anhydride polymer having polyethylene grafted to the polymer has an acid number of about 25 to 45 mg KOH/gr.

2. The ink composition of claim 1, wherein the co-resin polymer comprises an ethylene acrylic acid co-polymer, and wherein the ethylene acrylic acid co-polymer includes co-polymers having a DSC melting point of about 55 to 65° C.

3. The ink composition of claim 1, wherein the carrier liquid is a compound having a resistivity in excess of about $10^9$ ohm-cm and a dielectric constant below about 3.0.

4. The ink composition of claim 1, wherein the carrier liquid is a compound selected from an aliphatic hydrocarbon, an isoparaffinic compound, a paraffinic compound, a dearomatized hydrocarbon compound, and combinations thereof.

5. The ink composition of claim 1, wherein the carrier liquid is a compound selected from an aliphatic hydrocarbon, an isoparaffinic compound, a paraffinic compound, a dearomatized hydrocarbon compound, and combinations thereof; and wherein the co-resin polymer comprises an ethylene acrylic acid co-polymer, and wherein the ethylene acrylic acid co-polymer includes co-polymers having a DSC melting point of about 55 to 65° C.

6. The ink composition of claim 1, wherein the maleic anhydride polymer having polyethylene grafted to the polymer is present in the ink in an amount of at least 20% by weight.

7. A method of making an ink formulation, comprising: mixing a carrier liquid, a resin, a colorant, and a co-resin polymer, wherein the co-resin polymer includes an ethylene acrylic acid co-polymer and a maleic anhydride polymer having polyethylene grafted to the polymer, wherein the ethylene acrylic acid co-polymer includes co-polymers having a melt viscosity of about 20,000 to 40,000 cps at about 60° C. and an acid number of about 150 to 250 mg KOH/gr, and wherein the maleic anhydride polymer having polyethylene grafted to the polymer has an acid number of about 25 to 45 mg KOH/gr.

8. The method of claim 7, further comprising: mixing the resin and the co-resin polymer to form a first mixture; mixing the first mixture with the carrier liquid to form a third mixture; and mixing the third mixture with the colorant to form the ink formulation.

9. The method of claim 7, wherein the co-resin polymer comprises an ethylene acrylic acid co-polymer, and wherein the ethylene acrylic acid co-polymer include co-polymers has a DSC melting point of about 55 to 65° C.

10. The method of claim 7, wherein the carrier liquid is a compound having a resistivity in excess of about $10^9$ ohm-cm and a dielectric constant below about 3.0.

11. The method of claim 7, wherein the carrier liquid is a compound selected from an aliphatic hydrocarbon, an isoparaffinic compound, a paraffinic compound, a dearomatized hydrocarbon compound, and combinations thereof.

12. The method of claim 7, wherein the maleic anhydride polymer having polyethylene grafted to the polymer is present in the ink in an amount of at least 20% by weight.

13. A method of using an ink, comprising: disposing an ink onto a substrate, wherein the ink includes: a carrier liquid, a resin, a colorant, and a co-resin polymer, wherein the co-resin polymer includes an ethylene acrylic acid co-polymer and a maleic anhydride polymer having polyethylene grafted to the polymer, wherein the ethylene acrylic acid co-polymer includes co-polymers having a melt viscosity of about 20,000 to 40,000 cps at about 60° C. and an acid number of about 150 to 250 mg KOH/gr, and wherein the maleic anhydride polymer having polyethylene grafted to the polymer has an acid number of about 25 to 45 mg KOH/gr.

14. The method of claim 13, wherein the co-resin polymer comprises an ethylene acrylic acid co-polymer, and wherein the ethylene acrylic acid co-polymer includes co-polymers having a DSC melting point of about 55 to 65° C.

15. The method of claim 13, wherein the carrier liquid is a compound having a resistivity in excess of about $10^9$ ohm-cm and a dielectric constant below about 3.0.

16. The method of claim 7, wherein the maleic anhydride polymer having polyethylene grafted to the polymer is present in the ink in an amount of at least 20% by weight.

* * * * *

UNITED STATES PATENT AND TRADEMARK OFFICE
CERTIFICATE OF CORRECTION

| | | |
|---|---|---|
| PATENT NO. | : 7,977,023 B2 | |
| APPLICATION NO. | : 11/828386 | |
| DATED | : July 12, 2011 | |
| INVENTOR(S) | : Stella Stolin Roditi et al. | |

It is certified that error appears in the above-identified patent and that said Letters Patent is hereby corrected as shown below:

In column 10, line 4, in Claim 16, delete "claim 7," and insert -- claim 13, --, therefor.

Signed and Sealed this
Fourteenth Day of February, 2012

David J. Kappos
*Director of the United States Patent and Trademark Office*